US008475285B2

(12) United States Patent
Jarema, III et al.

(10) Patent No.: US 8,475,285 B2
(45) Date of Patent: Jul. 2, 2013

(54) SWINGING MOTHERBOARD FOR AMUSEMENT DEVICE

(75) Inventors: Stephen Jarema, III, Pittsgrove, NJ (US); Tam Nguyen, Philadelphia, PA (US)

(73) Assignee: Megatouch, LLC, Bristol, PA (US)

( * ) Notice: Subject to any disclaimer, the term of this patent is extended or adjusted under 35 U.S.C. 154(b) by 0 days.

(21) Appl. No.: 13/455,874

(22) Filed: Apr. 25, 2012

(65) Prior Publication Data
US 2013/0035160 A1 Feb. 7, 2013

Related U.S. Application Data

(60) Provisional application No. 61/515,153, filed on Aug. 4, 2011.

(51) Int. Cl.
*A63F 13/00* (2006.01)
(52) U.S. Cl.
USPC ............... 463/46; 174/50; 174/535; 174/542
(58) Field of Classification Search
USPC .............................. 463/46; 174/50, 535, 542
See application file for complete search history.

(56) References Cited

U.S. PATENT DOCUMENTS

| | | | |
|---|---|---|---|
| 4,440,457 A * | 4/1984 | Fogelman et al. | ............. 463/46 |
| 4,856,787 A | 8/1989 | Itkis | |
| 5,087,878 A | 2/1992 | Belmore, III | |
| 5,235,494 A | 8/1993 | Chang | |
| 5,519,577 A | 5/1996 | Dudas | |
| 5,575,717 A | 11/1996 | Houriet, Jr. et al. | |
| 5,743,799 A | 4/1998 | Houriet, Jr. et al. | |
| 5,918,089 A | 6/1999 | Malinich | |
| 6,201,703 B1 * | 3/2001 | Yamada et al. | ............... 361/752 |
| 6,570,775 B2 * | 5/2003 | Lai | ................. 361/801 |
| 6,667,889 B2 | 12/2003 | Jansen | |
| 6,822,878 B2 | 11/2004 | Dobbs | |
| 6,970,361 B2 | 11/2005 | Jansen | |
| 7,258,568 B2 | 8/2007 | Shih | |
| 2005/0155781 A1 * | 7/2005 | Kao et al. | ......................... 174/50 |
| 2008/0032254 A1 | 2/2008 | Plank et al. | |

* cited by examiner

*Primary Examiner* — James S McClellan
(74) *Attorney, Agent, or Firm* — Panitch Schwarze Belisario & Nadel LLP

(57) ABSTRACT

An amusement device having a display, a memory and a controller. The amusement device includes a housing defining an internal cavity and a chassis secured to the housing and defining a chassis plane. The chassis is positioned at least partially within the internal cavity. A control board support defines a board plane and the control board support has a closed position and an open position. In the closed position, the board plane is generally perpendicular to the chassis plane and in the open position, the board plane is generally parallel to the chassis plane. The control board support is slidably and rotatably movable between the closed position and the open position. The control board support is positioned within the internal cavity in the open and closed positions and when moving therebetween.

18 Claims, 13 Drawing Sheets

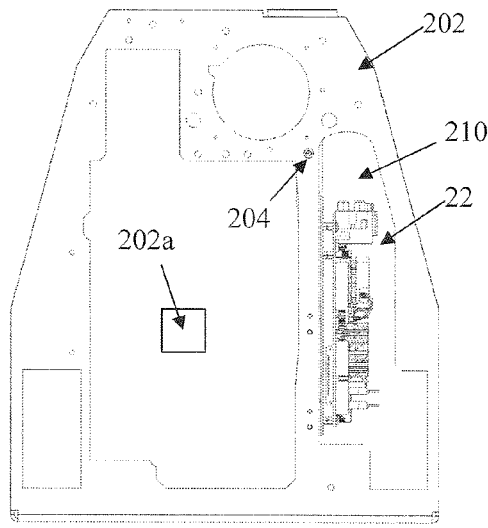
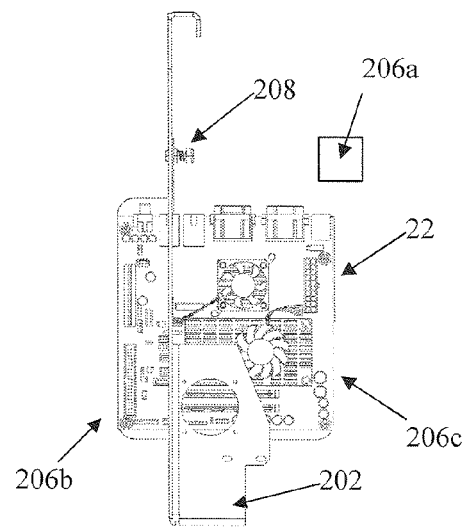
FIG. 3B
FIG. 3C
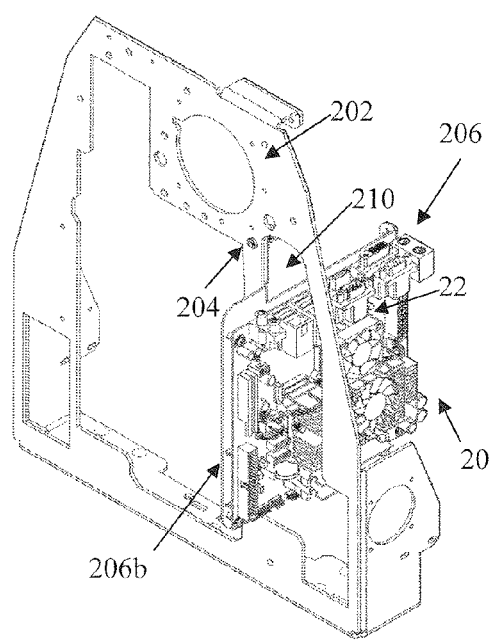
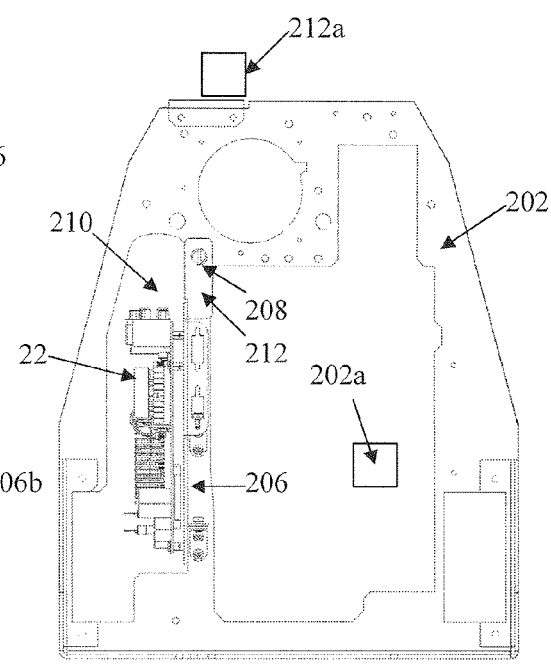
FIG. 3D
FIG. 3E

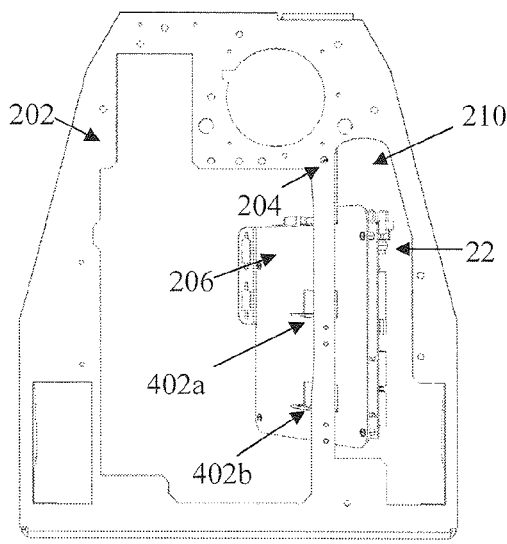
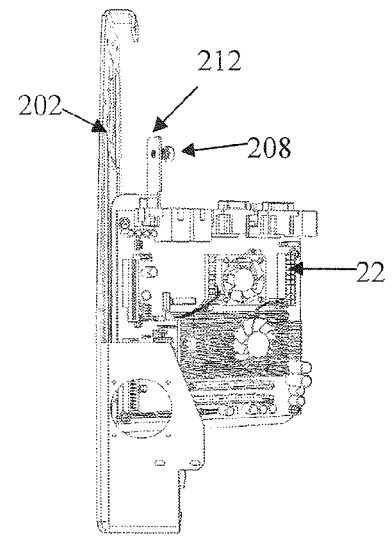
FIG. 5B    FIG. 5C
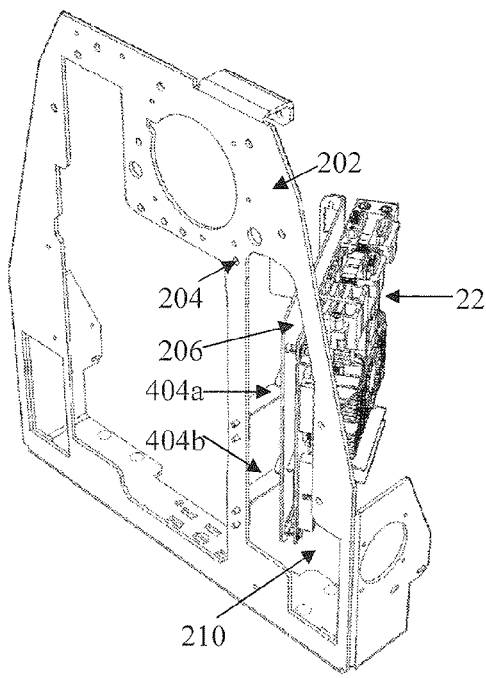
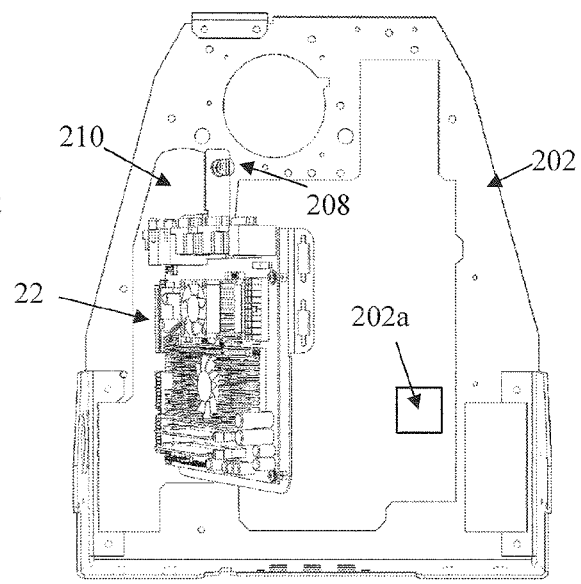
FIG. 5D    FIG. 5E

SWINGING MOTHERBOARD FOR AMUSEMENT DEVICE

CROSS-REFERENCE TO RELATED APPLICATIONS

This application is entitled to priority pursuant to 35 U.S.C. §119(e) to U.S. Provisional Patent Application No. 61/515,153, filed Aug. 4, 2011, which is incorporated by reference herein in its entirety.

BACKGROUND OF THE INVENTION

A preferred embodiment of the present invention relates generally to electronic amusement devices and systems. More particularly, the preferred embodiment of the present invention is directed to amusement devices having a motherboard that is swingably attached to the amusement device to provide easier access for service and repairs.

Amusement devices having electronic games for computers and touchscreens or other types of amusement devices are generally known. Amusement devices, such as game machines that allow a user to select games from a video display are disclosed in U.S. Pat. No. 4,856,787 ("Itkis"), U.S. Pat. No. 5,575,717 ("Houriet, Jr., et al."), and U.S. Pat. No. 5,743,799 ("Houriet, Jr., et al."). Each of the three (3) patents are incorporated herein by reference and show touchscreens for making a game selection from a menu of games. Such game machines or amusement devices typically operate upon input of currency (i.e., coin, token, paper money, credit/debit cards, player cards or the like) and are installed in locations such as bars, restaurants, airports, shopping malls, video arcades, casinos, or the like.

It is desirable for the touchscreen amusement devices to have a relatively small footprint. Though the footprint is preferably reduced, the amusement devices typically incorporate a large number of electronic components within their footprint and/or external housing. The density of the components arranged inside the amusement device housing makes on-site service, upgrading and repair of the amusement device challenging. For example, to minimize the amusement device footprint, the motherboard is typically installed perpendicular to the housing, making it difficult for a technician to access components on the face of the motherboard without removing the motherboard from the housing or somehow exposing the motherboard to the technician for access, repair and/or upgrade of the motherboard.

Thus, it is desirable to provide an amusement device having an easily accessible and serviceable motherboard. It is further desirable to provide a swinging motherboard that can be accessed by the technician without disassembling the amusement device. It is also desirable to design, develop and deploy an amusement device with a movable motherboard therein, wherein the motherboard is positioned to preserve space in a closed position, but is movable to an open position, wherein access for repair, service and/or upgrade of the motherboard is relatively simple for the technician through a service opening in the housing.

BRIEF SUMMARY OF THE INVENTION

In a preferred embodiment, the present application is directed to an amusement device having a display, a memory and a controller. The amusement device includes a housing defining an internal cavity and a chassis secured to the housing and defining a chassis plane. The chassis is positioned at least partially within the internal cavity. A control board support defines a board plane and the control board support has a closed position and an open position. In the closed position, the board plane is generally perpendicular to the chassis plane and in the open position, the board plane is generally parallel to the chassis plane. The control board support is slidably and pivotably movable between the closed position and the open position. The control board support is positioned within the internal cavity in the open and closed positions and when moving therebetween.

In another aspect, the present application is directed to an amusement device having a display, a memory and a controller. The amusement device includes a housing defining an internal cavity and a service opening. A chassis is secured to the housing and is positioned at least partially within the internal cavity. The chassis defines a chassis plane. A control board support defines a board plane and has a board side and a rear side. A motherboard is mounted to the board side of the control board. A slide mount is secured to the rear side of the control board support and has an elongated opening. A joist is mounted to the chassis and includes a pin positioned in the elongated opening. The control board is movable between a closed position and an open position by movement of the pin within the elongated opening. The motherboard faces the service opening in the open position to provide access through the opening for service and repair.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 3B is a rear elevational view of the chassis, control board support and motherboard of FIG. 3A, wherein the control board support is positioned in a closed position;

FIG. 3C is a left-side elevational view of the chassis, control board support and motherboard of FIG. 3A, wherein the control board support is positioned in the closed position;

FIG. 3D is a front perspective view of the chassis, control board support and motherboard of FIG. 3A, wherein the control board support is positioned in the closed position;

FIG. 3E is a rear elevational view of the chassis, control board support and motherboard of FIG. 3A, wherein the control board support is positioned in the closed position;

FIG. 5B is a front elevational view of the chassis, control board support, and motherboard of FIG. 3A, wherein the control board support and the motherboard are in the slid out and partially rotated position of FIG. 5A;

FIG. 5C is a side elevational view of the chassis, control board support, and motherboard of FIG. 3A, wherein the control board support and the motherboard are in the slid out and partially rotated position of FIG. 5A;

FIG. 5D is a front perspective view of the chassis, control board support, and motherboard of FIG. 3A, wherein the control board support and the motherboard are in the slid out and partially rotated position of FIG. 5A;

FIG. 5E is a rear elevational view of the chassis, control board support, and motherboard of FIG. 3A, wherein the control board support and the motherboard are in the slid out and partially rotated position of FIG. 5A;

DETAILED DESCRIPTION OF THE INVENTION

Figure 1A:
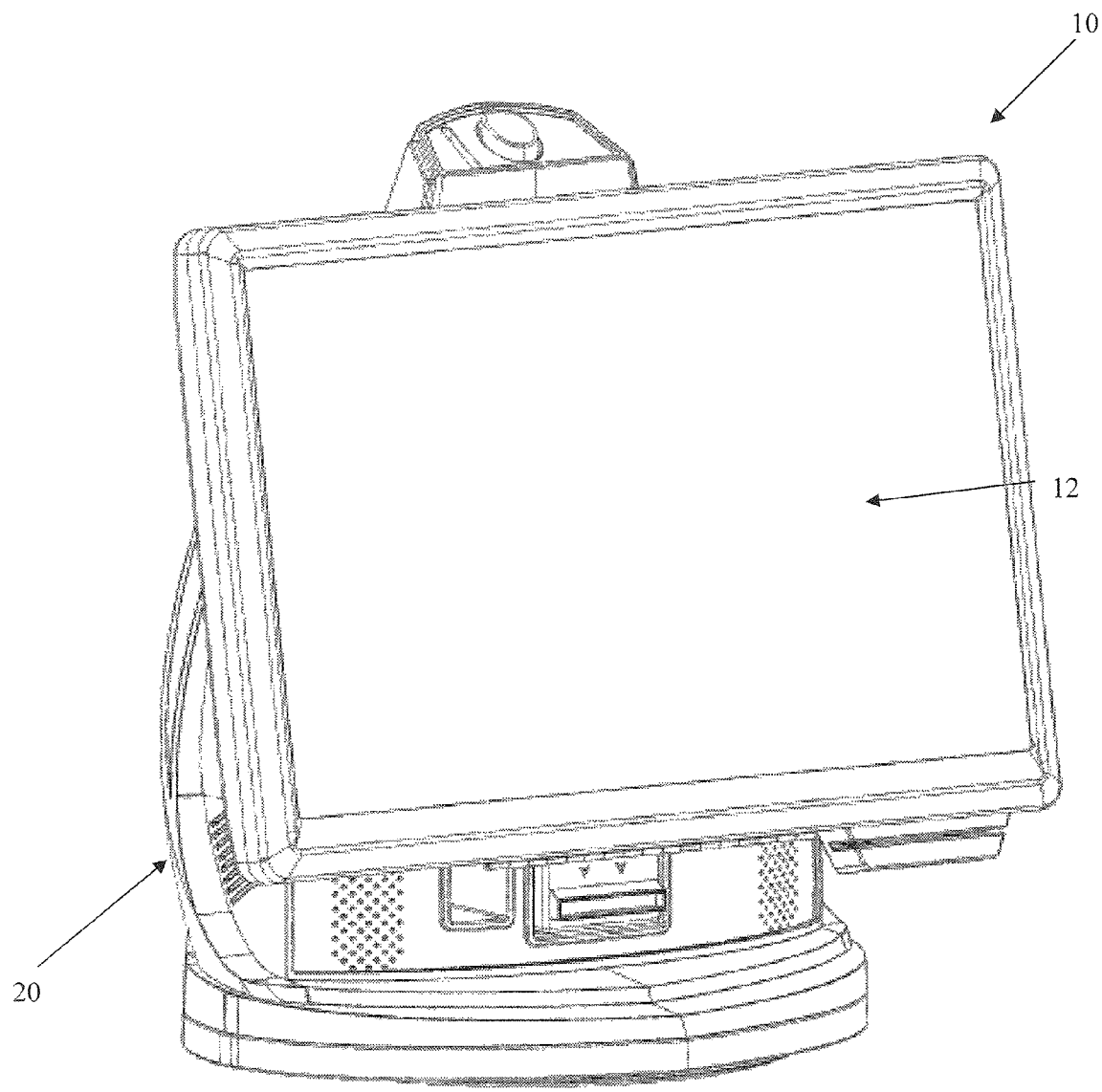
FIG. 1A is a front perspective view of an amusement device in accordance with a preferred embodiment of the present invention.

Certain terminology is used in the following description for convenience only and is not limiting. The words "right", "left", "lower", "upper", "front", "rear", "left" and "right" designate directions in the drawings to which reference is made and are not meant to be limiting. The words "inwardly" and "outwardly" refer to directions toward and away from, respectively, the geometric center of the preferred amusement device and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Referring to the drawings in detail, wherein like reference numerals indicate like elements throughout, there is shown in FIG. 1A a preferred embodiment of an amusement device 10. The amusement device 10 includes a controller U and a memory U2. The memory U2 can be any known or suitable memory device such as random access memory (RAM), read only memory (ROM), flash RAM, hard disk, optical disk, or the like. The amusement device 10 further includes a display 12 at its front that is operatively coupled to the controller U1. The display 12 preferably provides interaction for a user during game play and may be comprised of a video display and/or a touchscreen display 12, but is not so limited and may be comprised of any feature that provides visual feedback to a user. The amusement device 10 is preferably a counter-top or table-top apparatus, but may be arranged in any configuration, such as free-standing, floor-standing, table mount, wall mount, pole mount, and the like without departing from the broad inventive concept described herein.

The preferred amusement device 10 includes an input component 14 that receives value in order to establish one or more playable credits. The value received may be at least one of currency, coins, tokens, chits, credits, credit cards/debit cards, player cards or the like. Although two input components 14 are shown, the amusement device 10 may include any number of input components 14 to give a user an option for payment, for permitting multiple players, or the like. Preferably, the amusement device 10 is made operable upon actuation of the input component 14, for example, the user may only select and play an electronic game once value is received at the input component 14 and/or one or more playable credits are issued to the user. However, free selections may be offered at the discretion of an operator of the amusement device 10.

Turning now to the operation of the amusement device 10, the memory U2 stores one or more application programs, such as electronic games, a music or video jukebox program, or the like, and a system control program. However, the one or more application programs may also be stored remotely. The controller U1 controls the display 12 based upon the system control program retrieved from the memory U2 and based upon inputs from the display 12. As used herein, the system control program refers to all of the software functions outside of the application program files including an operating system, display control, input control, sound drivers, and the like. Other input devices which may be connected to the amusement device 10 include a pushbutton(s), a trackball or touchpad, a mouse, a joy-stick, a foot-pedal, a voice recognition system, a keypad or keyboard, and the like. But, preferably, the input device is the touchscreen display 12.

The amusement device 10 includes an operating mode and a setup mode. When the operating mode is selected, a player or user is selectively permitted to access the application programs. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing 20 of the amusement device 10.

Referring to FIGS. 1A-3A, a rear elevational view of the preferred embodiment of amusement device 10 is shown. The amusement device 10 includes the housing 20 that defines a hollow internal cavity 16 for maintaining the various components of the amusement device 10. The housing 20 generally protects the various components, which are maintained within the internal cavity 16. The housing 20 includes a service opening 30 for allowing access to the components of the amusement device 10 by a servicing technician. Components of the amusement device 10, including a motherboard 22, the bill collector 14 and the like, are accessible through the service opening 30 in the housing 20 to provide access to the components in the internal cavity 16. The amusement device 10 also preferably includes an Ethernet port 24, a power plug 26, and voltage switch 28 that are exposed from the rear of the housing 20. The amusement device 10 is not limited to inclusion of the Ethernet port 24, power plug 26, or voltage switch 28 and may operate without these elements and/or these elements may be otherwise located in or on the amusement device 10.

Referring to FIGS. 3A-7B, the motherboard 22 is preferably attached to a control board support 206 and is preferably positioned within the internal cavity 16 of the housing 20 when assembled. The control board support 206 defines a board plane 206a. In a closed position, the board plane 206a of the control board support 206 is preferably perpendicular to a display plane 12a (FIG. 1B) defined by the display 12 and a chassis plane 202a defined by a chassis 202 (e.g., FIG. 3A) of amusement device 10. The chassis plane 202a and display plane 12a may not be perfectly perpendicular relative to the board plane 206a, as the display 12 may be slightly pitched about a horizontal axis for user comfort, the board plane 206a may be slightly pitched in nearly any direction to accommodate relatively tight packaging and space requirements within the internal cavity 16 and the chassis plane 202a may be slightly pitched to accommodate the housing 12 and various designs of the amusement device 10. However, in the preferred embodiment, the display plane 12a and the chassis plane 202a are generally perpendicular to the board plane 206a when the control board support 206 is in the closed position. In addition, in the preferred embodiment, the chassis plane 202a and the display plane 12a are generally parallel, but not perfectly parallel, as can be seen in FIG. 1A, the display plane 12a is slightly pitched vertically to accommodate ergonomic viewing of the display 12 by the user. Further, the display plane 12a is not fixed relative to the chassis plane 202a and may be movable to accommodate modification of the viewing angle for user comfort.

The chassis 202 is secured to the housing 20 and positioned at least partially within the internal cavity 16 and generally functions to support the amusement device 10. The chassis 202 is not limited to being completely positioned within the cavity 16 and may extend to the surface of the housing 20 or beyond the bounds of the housing 20, depending upon the preferred design and configuration of the amusement device 10.

Figure 1B:
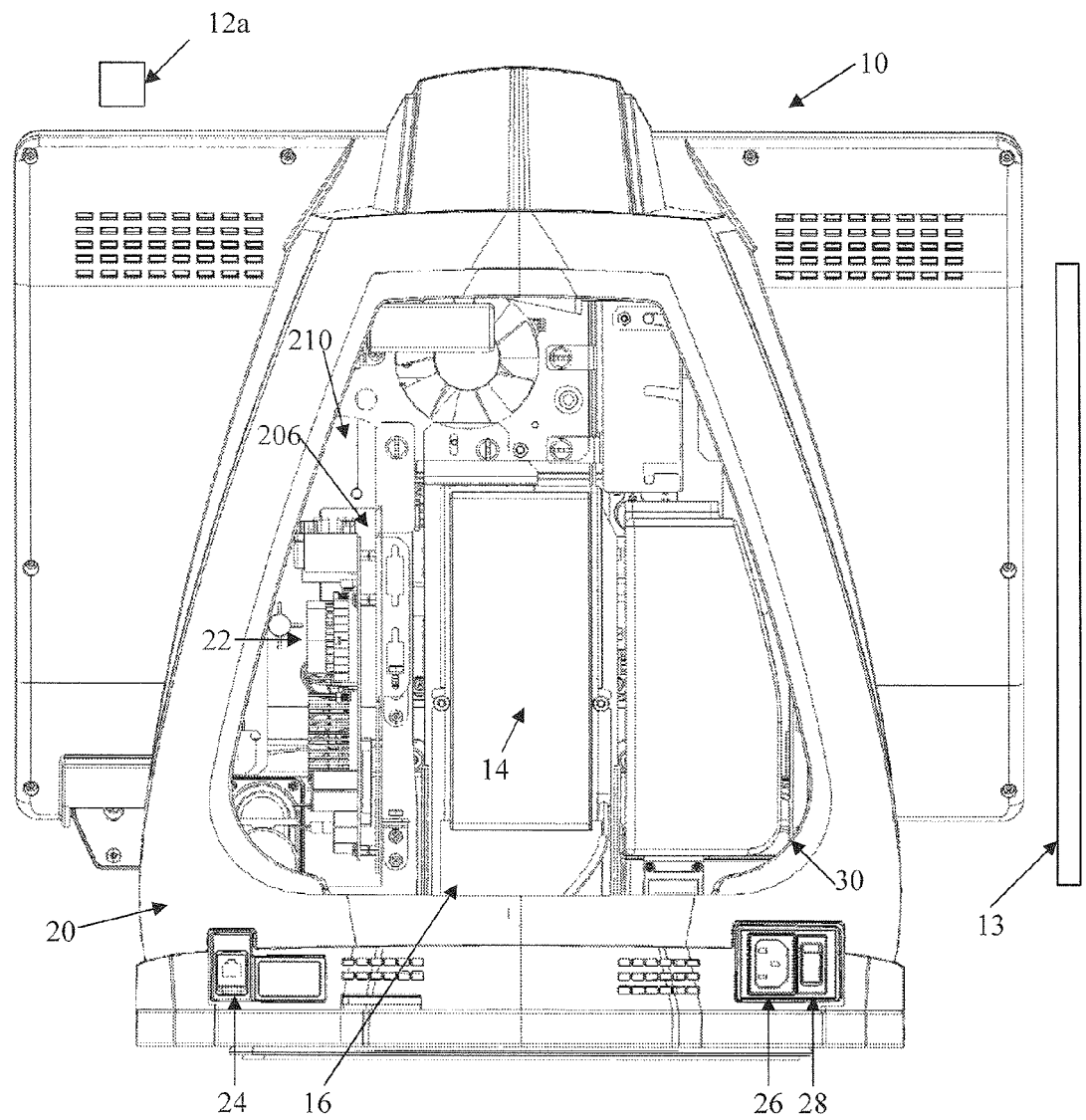
FIG. 1B is a rear elevational view of the amusement device of FIG. 1A.

When in the closed position, the components of the motherboard 22 typically includes at least the controller U1 and memory U2. When the motherboard 22 is in the closed position (FIGS. 1B and 3A-3F), the components are difficult or even impossible to access, as the technician would be required to work through the service opening 30 and then turn ninety degrees (90°) relative to a front to back direction to access and work on the motherboard 22. A service opening cover, lid, door or the like 13, which is shown in FIG. 1B removed from the housing 12 and from its side, is preferably installed to close the service opening 30 in the housing 20 when the amusement device 10 is not being serviced. While the invention is described with the motherboard 22 being swingably attached to the chassis 202, the invention is not so limited. Any other component of the amusement device 10 whose footprint may be reduced by arranging it perpendicularly to chassis 202 may be swingably attached to chassis 202 using the system and technique described herein.

Figure 2:
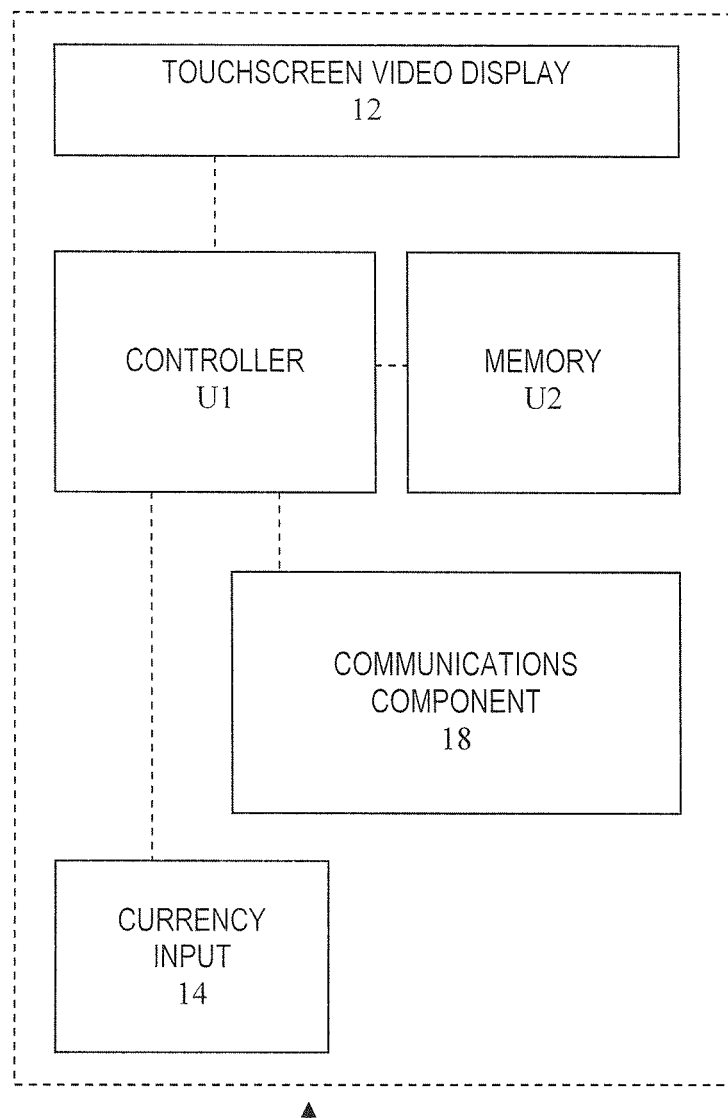
FIG. 2 is a schematic block diagram of the amusement device of FIG. 1A, schematically showing operational components of the preferred amusement device.

FIG. 2 is a schematic block diagram of the amusement device 10 described above. The display 12 is coupled to the controller U1. Also coupled to the controller U1 is a currency input 14. The currency input 14 may accept at least one of coins (or tokens), currency (e.g. paper money or the like), credit cards/debit cards, and the like. Although only one currency input 14 is shown, the amusement device 10 may include more than one input component 14 to give a user an option for payment, for permitting multiple players, or the like. Preferably, the amusement device 10 is made operable upon payment by a user, which may optionally be received via the currency input 14.

The amusement device 10 also preferably includes a communications component 18, such as the Ethernet port 24, a wireless transceiver, an infrared (IR) port, or the like. Using the communications component 18, the amusement device 10 may communicate with other devices or file servers, access the Internet, communicate over wide area networks (WANs) or local area networks (LANs), or the like. For example, the amusement device 10 may connect with a second amusement device (not shown) using the communications component 18. The second amusement device optionally includes all of the same components and features as amusement device 10. The communications component 18 is connected to the controller U1 and through the controller U1 to the memory U2. The amusement device 10 includes an operating mode and a setup mode. To switch from the operating mode to the setup mode, when an operator is present at the amusement device 10, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 10. When the operating mode is selected, a player or user is selectively permitted to access the application programs. When the setup mode is selected, the owner/operator is permitted to make system setup adjustments.

Figure 3A:
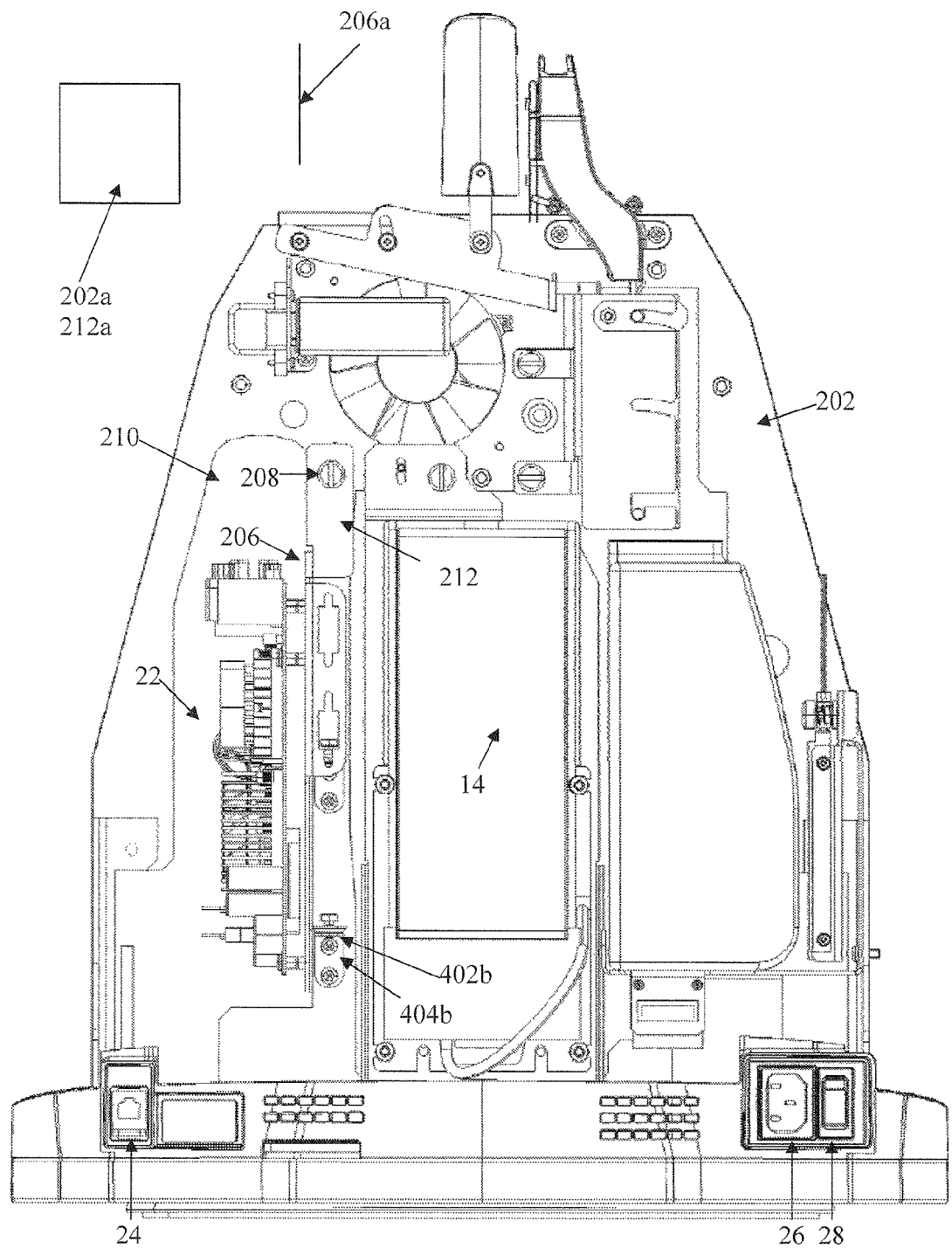
FIG. 3A is a front elevational view of a portion of the amusement device of FIG. 1B showing a chassis, a control board support and a motherboard, as well as additional components, with a housing and other components of the preferred amusement device removed for clarity.

FIG. 3A is a rear elevational view of a portion of the amusement device 10 of FIG. 1B with the control board support 206 and the motherboard 22 positioned in the closed position in accordance with the preferred embodiment. The components of the amusement device 10, including the control board support 206 and motherboard 22 are shown attached to the chassis 202. In the closed position of the control board support 206 and mounted motherboard 22, the board plane 206a is generally perpendicular to the chassis plane 202a defined by the chassis 202. The chassis 202 is preferably the main support structure of the amusement device 10 and includes a plurality of mounting positions for most of the major components of the amusement device 10, including the motherboard 22 and the bill collector 14. The control board support 206 preferably includes a plurality of mounting points for mounting the motherboard 22 thereon. The chassis 202 is preferably mounted at least partially within the internal cavity 16 of the housing 12, but is not so limited. Portions of the chassis 202 may extend beyond the bounds of the internal cavity 16 and/or the housing 12. The control board support 206 may be comprised of a standard ATX or micro-ATX motherboard tray. However, other arrangements for mounting the motherboard 22 in the amusement device 10 may be utilized without departing from the present invention.

Referring to FIGS. 3C-3G, in the preferred embodiment, one or more slide mounts 402a, 402b slidably and pivotably or rotatably attach the control board support 206 to one or more joists 404a, 404b, which are attached to the chassis 202. The joists 404a, 404b and slide mounts 402a, 402b permit the control board support 206 and motherboard 22 to slide and pivot between the open and closed positions in the preferred embodiment. However, other arrangements for slidably and rotatably attaching the control board support 206 may be utilized without departing from the present invention. For example, the control board support 206 may be attached to an independent support structure (not shown) or component of the amusement device 10 within the housing 20. The chassis 202 preferably includes a relief hole 210 through which the control board support 206 and the mounted motherboard 22 pass when they are arranged in the closed position. The relief hole 210 in the chassis 202 is preferably large enough so that the components of the motherboard 22 do not make contact with the chassis 202 in the closed position. The relief hole 210 results in a front portion 206b of the control board support 206 being positioned in front of the chassis 202 and a rear portion 206c of the control board support being positioned to a rear side of the chassis 202 in the closed position (FIG. 3C). In contrast, in the open position, the control board support 206 is positioned outside of the relief hole 210 when the control board support 206 is in the open position (FIGS. 6A-6E).

FIG. 3B is a front elevational view of an amusement device 10 chassis 202 with the control board support 206 and the attached motherboard 22 being located in a closed position in accordance with the preferred embodiment. FIG. 3C is a left-side elevational view of the chassis 202, control board support 206 and motherboard 22 of FIG. 3B with the control board support 206 and the motherboard 22 in the closed position and showing the front portion 206b extending through the relief hole 210 and beyond the front of the chassis 202. FIG. 3D is a front perspective view of the chassis 202, control board support 206 and motherboard 22 of FIG. 3B with the control board support 206 and the motherboard 22 in the closed position. FIG. 3E is a rear elevational view of the chassis 202, control board support 206 and motherboard 22 of FIG. 3B with the control board support 206 and the motherboard 22 in the closed position.

As shown in FIGS. 3B-3G, in the closed position, the control board support 206 and motherboard 22 are preferably arranged in alignment with the board plane 206a perpendicular to the chassis plane 202a. At least a portion of the motherboard 22 and the front portion 206b of the control board support 206 pass through the relief hole 210 in the chassis 202 and are positioned beyond a front face of the chassis 202 in the closed position. In the preferred embodiment, a screw 208 secures the control board support 206 (and mounted motherboard 22) to chassis 202 via threaded screw hole 204 in the chassis 202. For ease of operation, the screw 208 is preferably a thumbscrew 208. The amusement device 10 is not limited to inclusion of the screw 208 and threaded screw hole 204 to secure the control board support 206 to the chassis 202 in the closed position. Any other method of securing the control board support 206 to chassis 202, including fasteners such as bolts, clamps, clasps, clips, flanges, snaps, straps, ties, hook and loop material, adhesive bonding, magnets and the like may be used. Further, the control board support 206 does not need to be mechanically secured to the chassis 202 in the closed position and may be attached or secured to the chassis 202 by gravity and friction inherent in the structure that movably secures the control board support 206 of the chassis 202. While the motherboard 22 is preferably secured to the control board support 206, which is movably secured to the chassis 202, the motherboard 22 may be directly, movably secured to the chassis 202, without the intermediate control board support 206 mounted to the chassis 202. Further, the motherboard 22 may be directly attached to slide mounts 402.

In the closed position, the motherboard 22 takes up a minimal amount of space within the housing 20 and is maintained within the internal cavity 16, but the components on the motherboard 22 are difficult to access from outside of the housing 20 in the closed position. Thus, in order to service the motherboard 22, it is preferably accessible from outside of the housing 20. In order to access the motherboard 22, the control board support 206 and motherboard 22 assembly are slid out, pivoted and/or rotated into a position preferably parallel to the chassis 202, as described with reference to FIGS. 4A-6E, such that the motherboard 22 is relatively easily accessible through the service opening 30.

While the control board support 206 and motherboard 22 are described as being slidable, pivotable and/or rotatable from the closed position wherein the board plane 206a is generally perpendicular to the chassis plane 202a to an open position (FIGS. 6A-6E) wherein the board plane 206a is generally parallel to the chassis plane 202a, other positions are within the scope of this invention. For example, the closed position of the control board support 206 and motherboard 22 may be in a plane defining a forty-five degree (45°) angle relative to the chassis plane 202a of the chassis 202. Further, as in the case where the service opening 30 of the housing 20 is not generally in a plane parallel to the chassis plane 202a, the open position of control board support 206 and motherboard 22 may be at nearly any angle that positions the motherboard 22 to be easily accessible through service opening 30 of the housing 20.

Figure 4A:
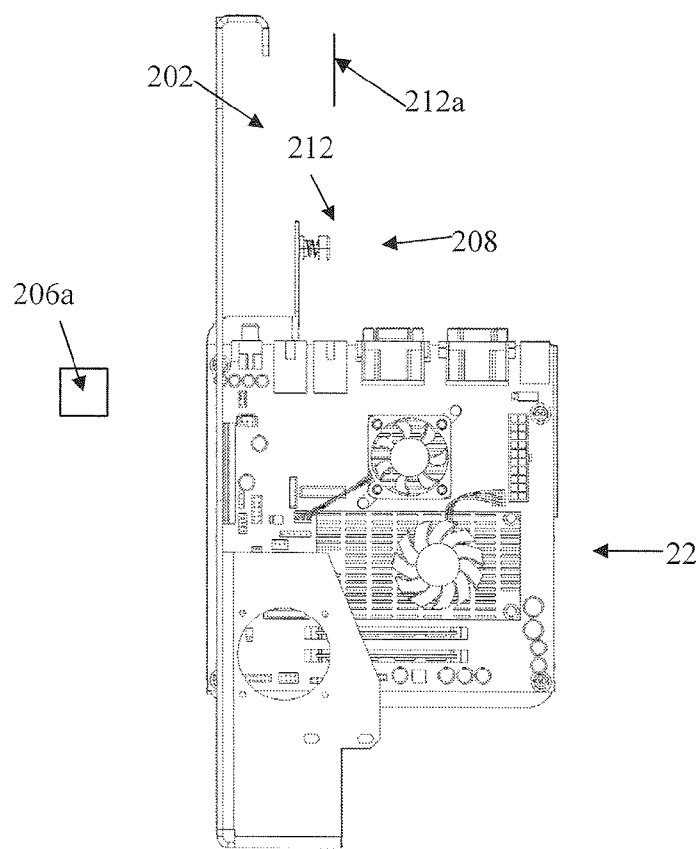
FIG. 4A is a left-side elevational view of the chassis, control board support and motherboard of FIG. 3A, wherein the control board support and the motherboard are in a slid out position.
Figure 4B:
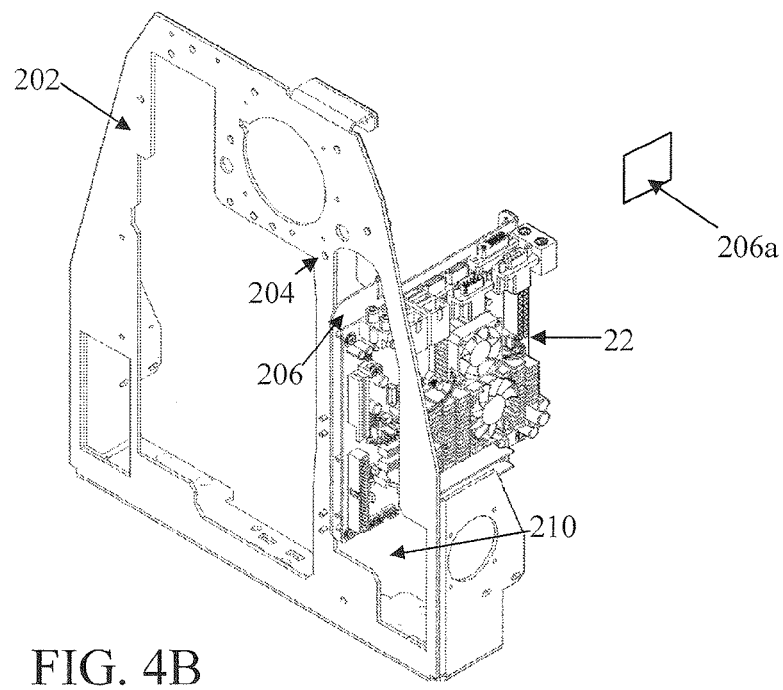
FIG. 4B is a front perspective view of the chassis, control board support and motherboard of FIG. 3A, wherein the control board support and the motherboard are in the slid out position of FIG. 4A.

FIG. 4A is a left-side elevational view of the chassis 202, control board support 206 and motherboard 22 of FIG. 3A with the control board support 206 and the motherboard 22 in a slid out position such that the front portion 206b is generally positioned to the rear of the chassis 202 and extends only slightly into and through the relief hole 210. FIG. 4B is a front perspective view of the chassis 202, control board support 206 and motherboard 22 of FIG. 4A with the control board support 206 and the motherboard 22 in the slid out position. In order to move the control board support 206 from the closed position to the slid out position in the preferred embodiment, the screw 208 is unscrewed from the threaded screw hole 204 of the chassis 202. Once unscrewed, the control board support 206 and motherboard 22 may be pulled away from the chassis 202 and through the relief hole 210, thereby sliding the control board support 206 and motherboard 22 away from the chassis 202 along the slide mounts 402a, 402b. Though the control board support 206 is rotatably attached to chassis 202, due to the arrangement of components within the housing 20 in the preferred embodiment, such as the adjacent bill collector 14 (not shown in FIGS. 4A-4B) and relief hole 210, the control board support 206 and motherboard 22 assembly may not be rotatable or pivotable until it has been at least partially slid rearwardly away from the chassis 202. Preferably, the control board support 206 and motherboard 22 are fully slid out along the slide mounts 402a, 402b to the slid out position prior to rotating or pivoting toward the open position. The control board support 206 and motherboard 22 are not limited to having to linearly slide away from the closed position to the slid out position prior to pivoting and/or rotating toward the open position. The control board support 206 and motherboard 22 may pivot directly from the closed position or may pivot slightly as it moves from the closed position to the slid out position as it transitions to the open position.

Figure 5A:
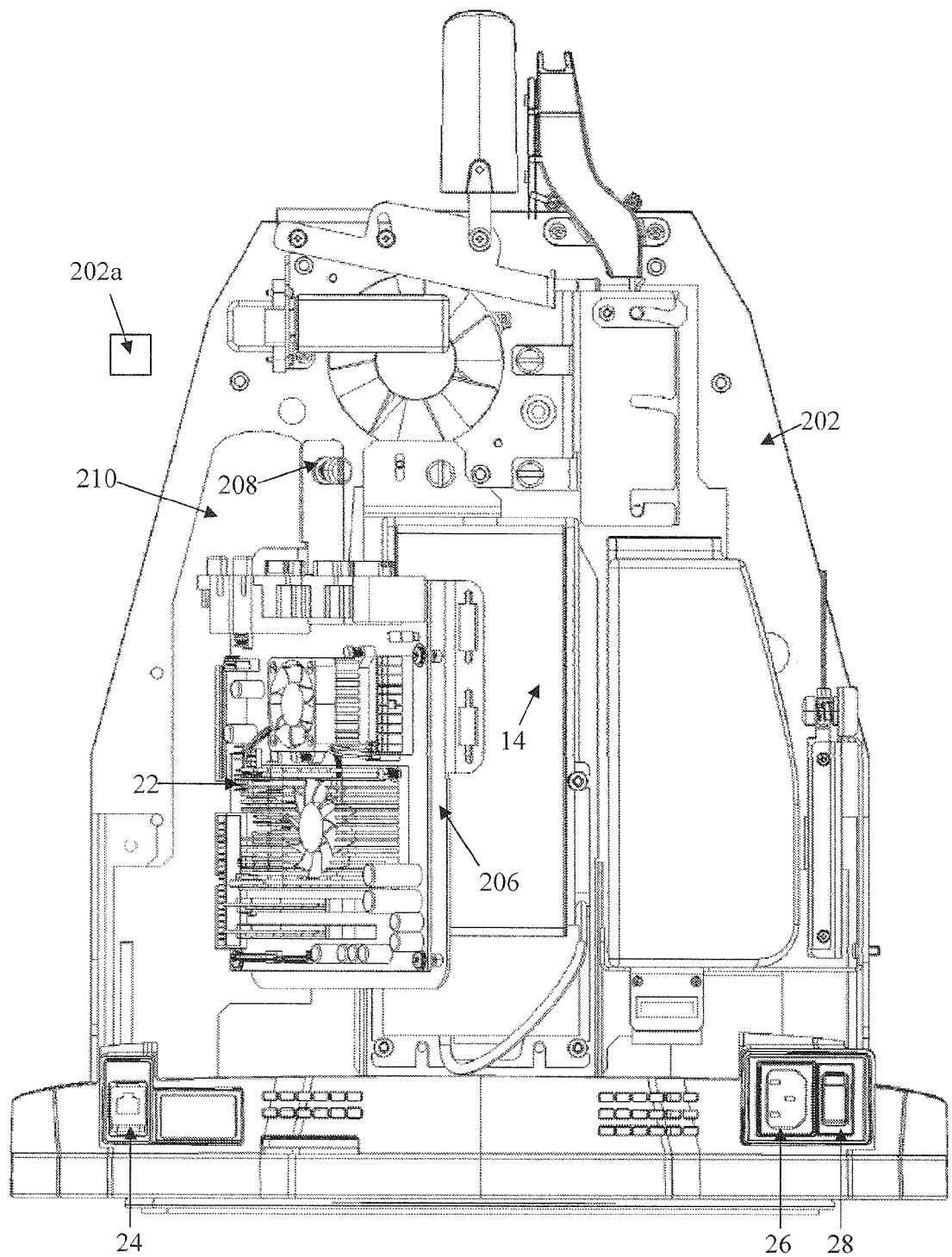
FIG. 5A is a rear elevational view of the chassis, control board support, motherboard and additional components of the amusement device of FIG. 3A, wherein the control board support and the motherboard are in a slid out and partially rotated position.

Referring to FIG. 5A, a rear elevational view of the amusement device chassis assembly with the control board support 206 and motherboard 22 assembly slid out and partially pivoted and/or rotated is shown. In this partially rotated position, the bill collector 14 or any other component within housing 20 or attached to chassis 202 will preferably not interfere with the rotating motion of the control board support 206 and motherboard 22 assembly. In addition, the sliding, pivoting and rotational motion of the control board support 206 and motherboard 22 are preferably designed and configured such that the control board support 206 and motherboard 22 are maintained within the internal cavity 16 during movement from the closed position to the open position or extend only slightly out of the service opening 30 during the transition between the open and closed positions.

FIG. 5B is a front elevational view of the chassis 202, control board support 206 and motherboard 22 of FIG. 3B with the control board support 206 and motherboard 22 in the slid out and partially rotated position. FIG. 5C is a left-side elevational view of the chassis 202, control board support 206 and motherboard 22 of FIG. 5B with the control board support 206 and the motherboard 22 in the slid out and partially rotated position. FIG. 5D is a front perspective view of the chassis 202, control board support 206 and motherboard 22 of FIG. 5B with the control board support 206 and the motherboard 22 in the slid out and partially rotated position. FIG. 5E is a rear elevational view of the chassis 202, control board support 206 and motherboard 22 of FIG. 5B with the control board support 206 and the motherboard 22 in the slid out and partially rotated position.

Referring to FIGS. 3G, 3F, 7A and 7B, the control board support 206 includes two attached slide mounts 402a, 402b. In one preferred embodiment, in order to reduce weight and manufacturing costs, the slide mounts 402a, 402b are fabricated as cutouts from the body of the control board support 206. Specifically, the slide mounts 402a, 402b of the preferred embodiment are comprised of flanges formed by bent portions of the control board support 206 that extend from a rear side 207b of the control board support 206 and are positioned at an approximately ninety degree (90°) angle relative to the board plane 206a. The first and second slide mounts 402a, 402b are not limited to being formed as cutouts from the control board support 206 and may be separately manufactured slide mounts 402a, 402b that are attached to the control board support 206. Preferably, the first and second slide mounts 402a, 402b, are slide brackets having a slot or elongated opening 500, 502. The sizing and position of the slide mounts 402a, 402b on the control board support 206, as well as the sizing of the slot or elongated opening 500, 502 in the first and second slide mounts 402a, 402b are determined based on the internal features of the chassis 202, the housing 20 and components attached thereto. Referring to FIG. 5C, the slide mounts 402a and 402b preferably allow the control board support 206 to be slid out sufficiently to enable the control board support 206 and motherboard 22 to rotate without interfering with any other components attached to chassis 202 and generally without making contact with chassis 202.

The slots or elongated openings 500, 502 in the first and slide mounts 402a, 402b allow the control board support 206 to slide and pivot relative to the housing 20. Preferably, the slots or elongated openings 500, 502 in the slide mounts 402a, 402b are equal in size and are in the range of one to three inches (1-3") long. The size of the slots or elongated openings 500, 502 in the slide mounts 402a, 402b define the distance that the control board support 206 and mounted motherboard 22 may be slid away from the chassis 202 and is preferably selected to avoid the motherboard 22 colliding with any of the components in the housing 20 of the amusement device 10. First and second dowel pins 504, 506 are positioned in first or front ends 500a, 502a of the slots or elongated openings 500, 502 in the slide mounts 402a, 402b in the open position, while the dowel pins 504, 506 are positioned in second or rear ends 500b, 502b of the slots or elongated openings 500, 502 of the slide mounts 402a, 402b in the closed position, respectively.

In the preferred embodiment, the first and second joists 404a, 404b are comprised of a first or upper L-shaped bracket or joist 404a and a second or lower L-shaped bracket or joist 404b. In addition, the dowel pins 504, 506 are comprised of a first dowel pin 504 having a first head 504a and a first shaft 504b and a second dowel pin 506 having a second head 506a and a second shaft 506b. The first end of the first dowel pin 504 is fixed to the distal end of the first L-shaped bracket or joist 404a and the first end of the second dowel pin 506 is fixed to the distal end of the second L-shaped bracket or joist 404b. The first head 504a is spaced from the first end of the first dowel pin 504 with the first shaft 504b therebetween, such that the first shaft 504b rides in the first slot or elongated opening 500 in the preferred assembled configuration. In addition, the second head 506a is spaced from the first end with the second dowel pin 506 with the second shaft 506b therebetween such that the second shaft 506b rides in the second slot or elongated opening 502 in the preferred assembled configuration. Accordingly, in the assembled configuration, the first and second shafts 504b, 506b are slidingly and pivotably secured in the first and second slots or elongated openings 500, 502 by the first and second heads 504a, 506a and the distal ends of the L-shaped brackets or joists 404a, 404b. Further, contact between the first and second shafts 504b, 506b and the front and rear ends 500a, 502a, 500b, 502b of the elongated openings 500, 502 limits the overall sliding travel of the control board support 206 relative to the chassis 202.

Figure 3F:
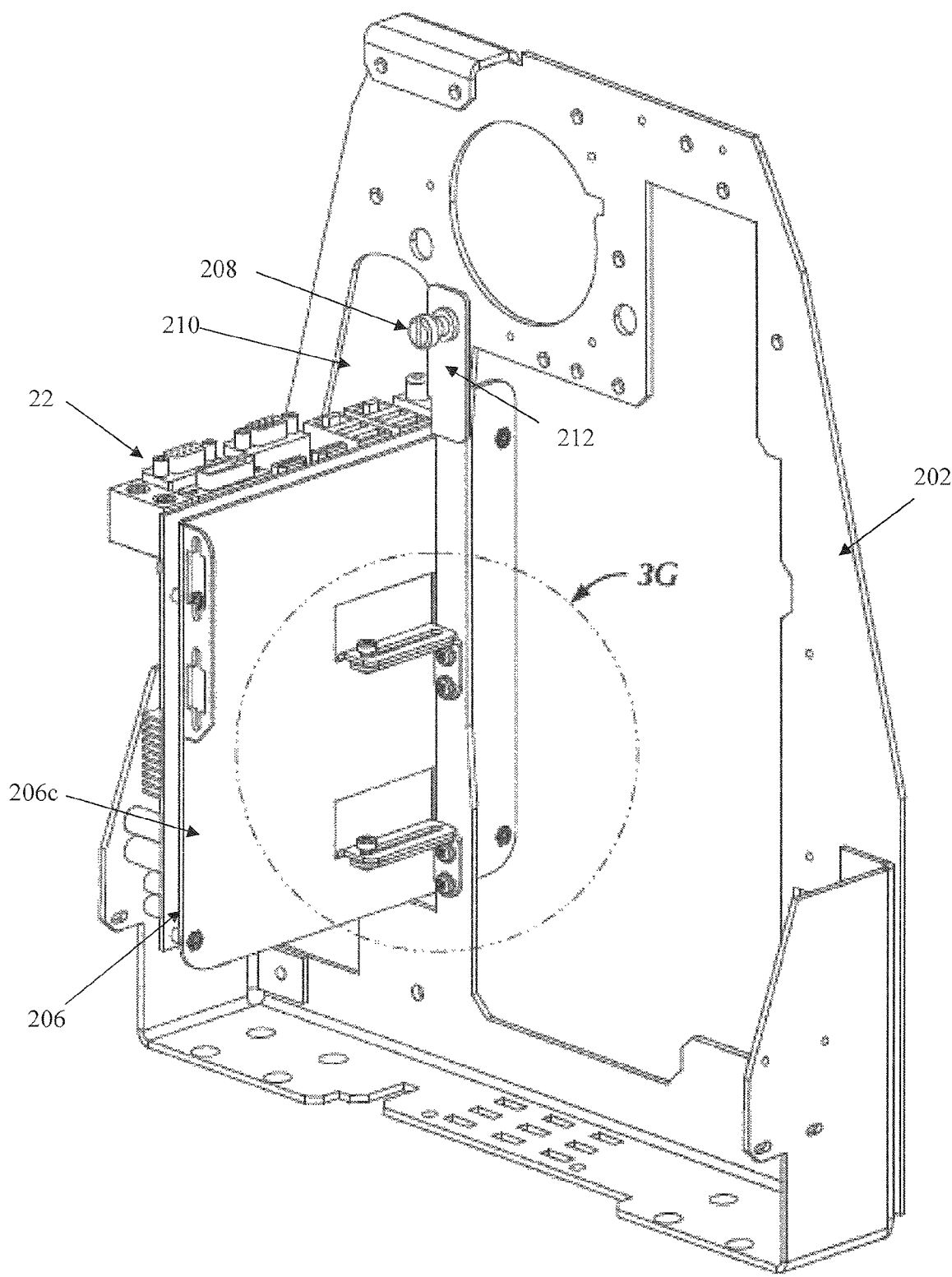
FIG. 3F is a rear perspective view of the chassis, control board support and motherboard of FIG. 3A, wherein the control board support is positioned in the closed position.
Figure 3G:
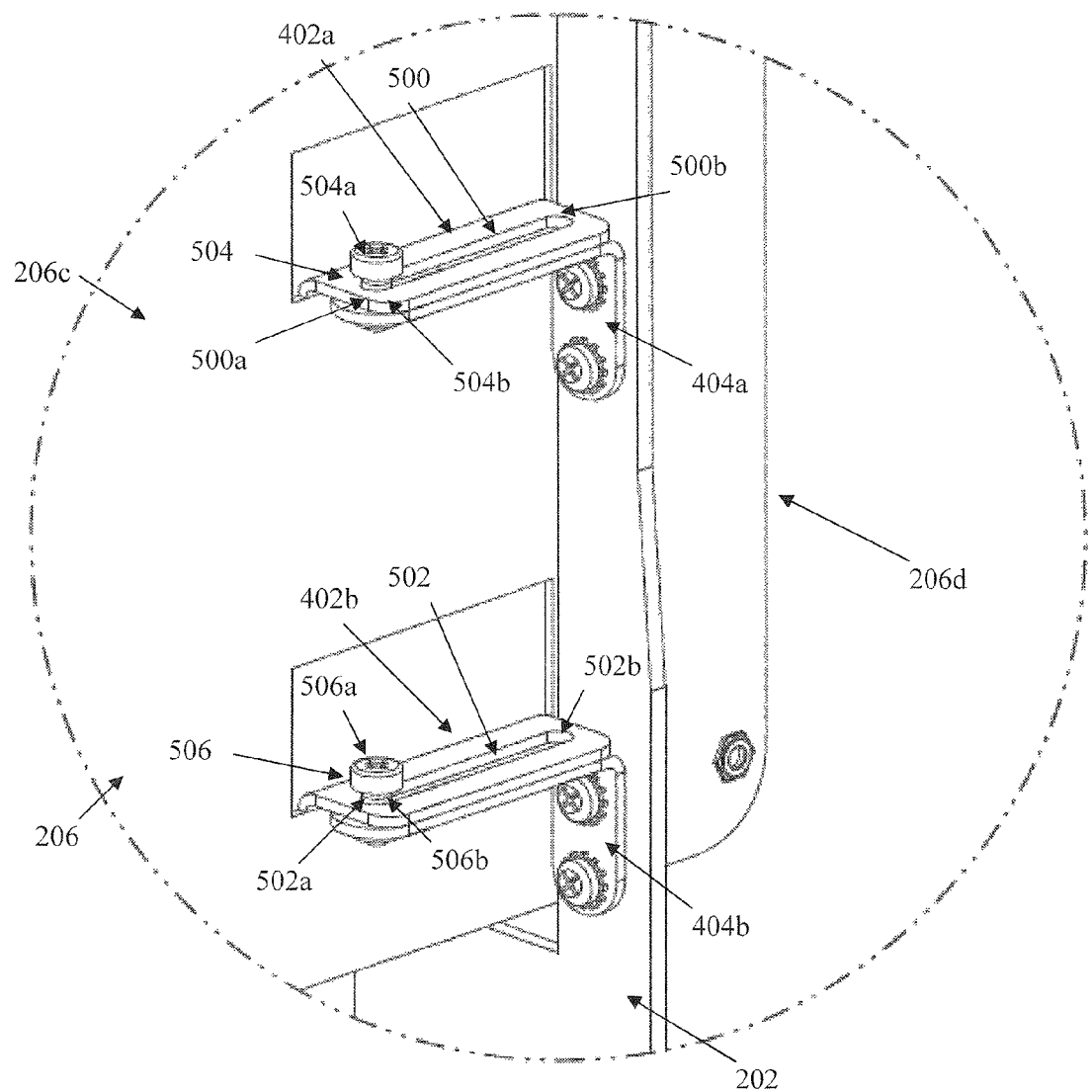
FIG. 3G is a magnified rear perspective view of the chassis and control board support of FIG. 3A, taken from within circle 3G of FIG. 3F.

Referring to FIGS. 3F and 3G, in the preferred embodiment, the dowel pins 504, 506 ride in the elongated openings 500, 502 as the control board support 206 moves from the closed position to the slid out position and to the open position. The elongated openings or slots 500, 502 guide the movement of the control board support 206 and provide mechanical stops for the movement between the closed, slid out and open positions, without requiring a specific path of travel in the preferred embodiment.

Referring now to FIG. 3F, 3G and 5D, the joists 404a, 404b are attached to the chassis 202 and to the control board support 206 through the positioning of the first and second dowel pins 504, 506 in the slots or elongated openings 500, 502 of the slide mounts 402a, 402b, respectively. The joists 404a, 404b may be part of the chassis 202 or attached to chassis 202 such that at least a portion of the joists 404a, 404b are positioned in a plane preferably perpendicular to the chassis plane 202a. The joists 404a, 404b are preferably constructed of an aluminum material and may be attached to the chassis 202 by fasteners, welds or any other technique known in the art for attaching materials to one another. In the preferred embodiment, the joists 404a, 404b are connected to the slide mounts 402a, 402b by the cylindrical dowel pins 504, 506. Referring to FIG. 5E, when the control board support 206 and motherboard 22 are moved from the closed position to the open position, portions of the components on the face of motherboard 22 may pass through and/or into the service opening 30 of housing 20.

While the sliding and rotating functionality of the control board support 206 has been shown using the two slide mounts 402a, 402b attached to the two joists 404a, 404b by the two dowel pins 504, 506, the invention is not so limited. Various other structures for providing similar sliding and rotating functionality may be utilized to move the control board support 206 and motherboard 22 from the closed to the open position. For example, the joists 404a, 404b and slide mounts 402a, 402b may be replaced by sliding hinges, rails and the like.

Referring now to FIGS. 6A-6E, the control board support 206 and motherboard 22 are fully rotated to be arranged in the open position such that the board plane 206a of the control board support 206 and the motherboard 22 are positioned in a plane preferably parallel to the chassis plane 202a of the chassis 202. In the open position, components behind the motherboard 22, such as the bill collector 14 are generally not accessible. However, the motherboard 22 is preferably accessible through the service opening 30 in the housing 20 so that the servicing agent can easily make repairs and upgrades to the components on the motherboard 22. Preferably, when in the open position, the control board support 206 and mounted motherboard 22 may be slid left or right along the slide mounts to better position the motherboard 22 within the opening 30 of housing 20, depending upon which portion of the motherboard 22 the technician is working on. Preferably, the door or service opening cover 13 of the housing 20 is blocked and cannot be closed while the motherboard 22 is in the open position.

Referring to FIGS. 1B and 6A-7B, the control board support 206 preferably has a board side 207a and the rear side 207b. The motherboard 22 is preferably mounted to the board side 207a and the rear side 207b is preferably mounted in partial facing engagement or immediately adjacent to an edge of the relief hole 210 of the chassis 202 in the closed position. The serviceable or upgradeable components of the motherboard 22 are preferably visible through the service opening 30 in the open position and with the service cover 13 removed from the housing 20.

Figure 6A:
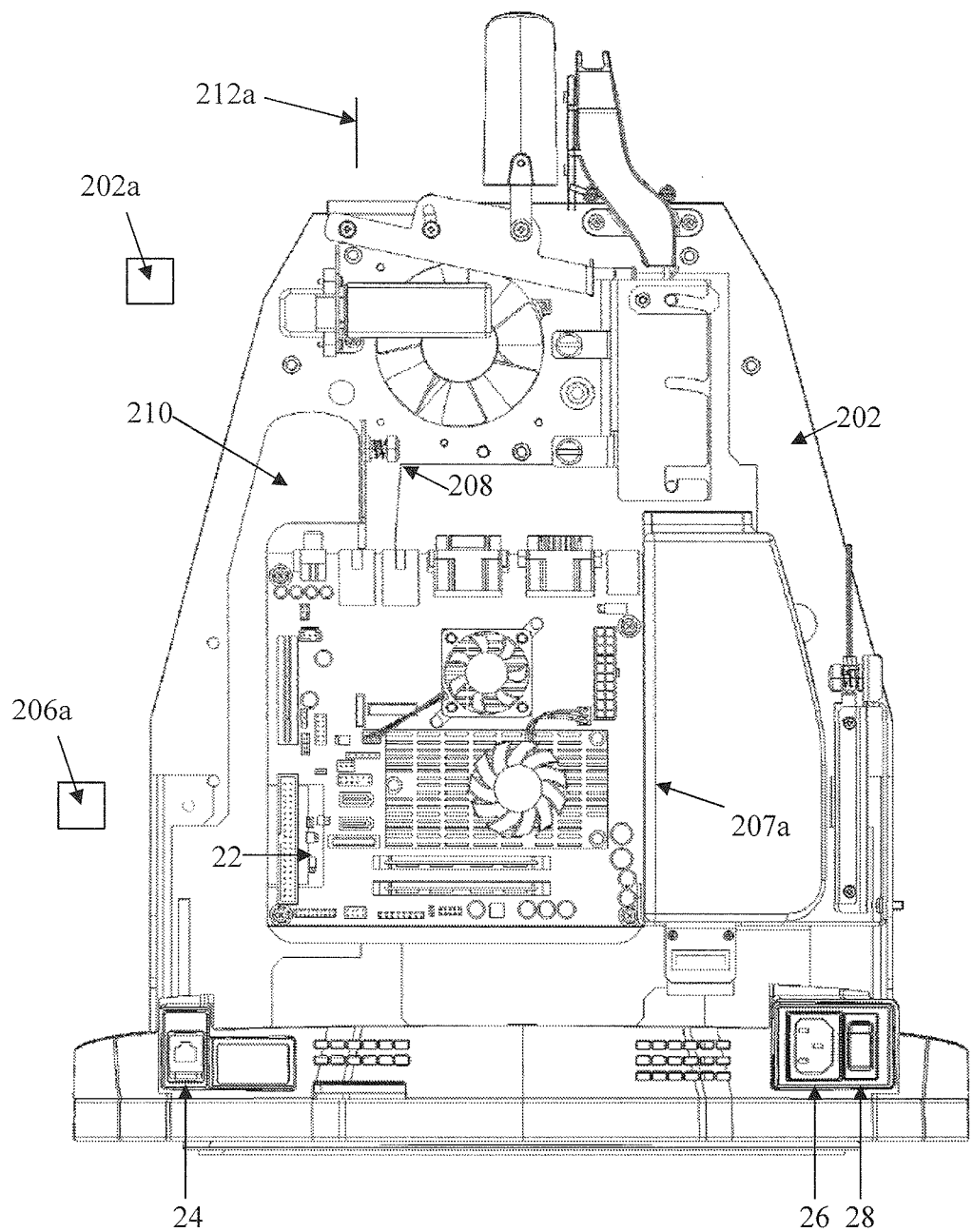
FIG. 6A is a rear elevational view of the chassis, control board support, motherboard and additional components of the amusement device of FIG. 3A, wherein the control board support and the motherboard are in an open position.
Figure 6B:
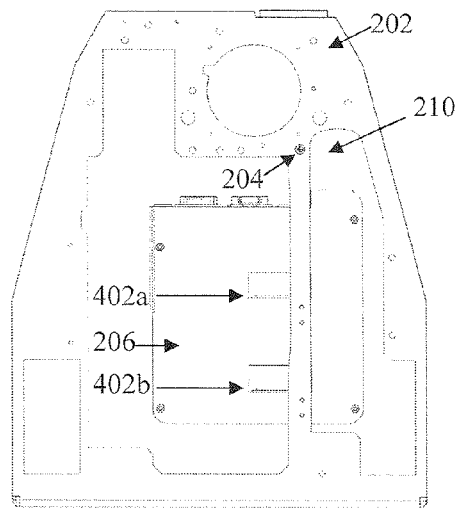
FIG. 6B is a front elevational view of the chassis, control board support, and motherboard of FIG. 3A, wherein the control board support and the motherboard are in the open position.
Figure 6C:
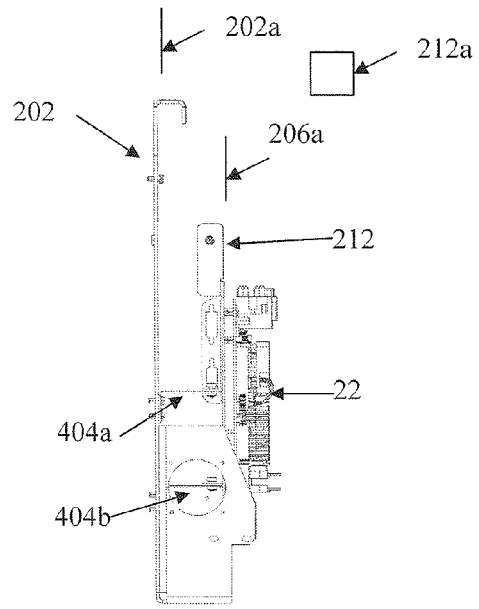
FIG. 6C is a left-side elevational view of the chassis, control board support, and motherboard of FIG. 3A, wherein the control board support and the motherboard are in the open position.
Figure 6D:
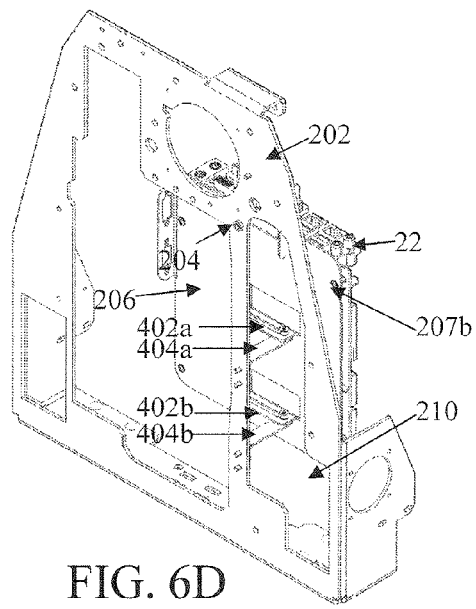
FIG. 6D is a front perspective view of the chassis, control board support, and motherboard of FIG. 3A, wherein the control board support and the motherboard are in the open position.
Figure 6E:
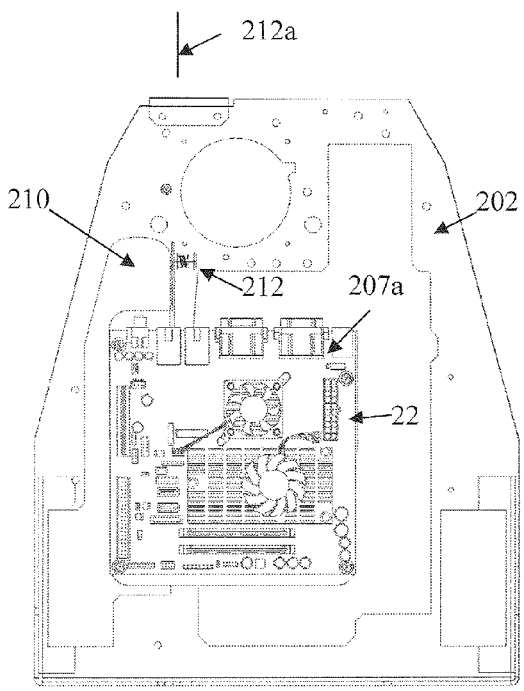
FIG. 6E is a rear elevational view of the chassis, control board support, and motherboard of FIG. 3A, wherein the control board support and the motherboard are in the open position.

FIG. 6B is a front elevational view of the chassis 202, control board support 206 and motherboard 22 of FIG. 3B with the control board support 206 and the motherboard 22 in the open position. FIG. 6C is a left-side elevational view of the chassis 202, control board support 206 and motherboard 22 of FIG. 6B with the control board support 206 and the motherboard 22 in the open position. FIG. 6D is a front perspective view of the chassis 202, control board support 206 and motherboard 22 of FIG. 6B with the control board support 206 and the motherboard 22 in the open position. FIG. 6E is a rear elevational view of the chassis 202, control board support 206 and motherboard 22 of FIG. 6B with the control board support 206 and the motherboard 22 in the open position.

The arrangement of the control board support 206 and motherboard 22 in a preferably parallel plane to the chassis plane 202a of the chassis 202 in the open position is best seen in FIGS. 6B-6E. In this open position, the slide mounts 402a, 404b form a substantially right angle with upper legs of the joists 404a, 404b, as shown in FIGS. 3G and 6D. The right angle position of the slide mounts 402a, 402b preferably prevents the control board support 206 and motherboard 22 from being slid toward or away from the chassis 202 as a result of the position of the first and second dowel pins 504, 506 in the first and second elongated openings 500, 502, respectively.

Referring to FIGS. 3A-6E, once the motherboard 22 has been serviced, the technician reverses the steps described above in order to bring the motherboard 22 to the closed position. First, the control board support 206 and mounted motherboard 22 are rotated from the open position to being preferably perpendicular to the chassis plane 202a of the chassis 202. Next, the control board support 206 and mounted motherboard 22 are slid toward the chassis 202 along the slide mounts 402a, 402b. Finally, the screw 208 is secured into threaded screw hole 204 of chassis 202 to secure the control board support 206 and motherboard 22 to the chassis 202. Once in the closed position, the door or cover 13 may then be placed over the service opening 30 of the housing 20.

Referring to FIGS. 3A, 3E, 3F, 4A, 5A, 5C, 5E, 6A, 6C and 6E-7B, the control board support 206 of the preferred embodiment includes a locking flange 212 extending from a top edge. The locking flange 212 is positioned in facing engagement with the chassis 202 in the closed position (FIGS. 3A, 3C and 3F) and is spaced from the chassis 202 in the open position (FIGS. 6A and 6C). The locking flange 212 defines a lock plane 212a that is generally parallel to the chassis plane 202a in the closed position and generally perpendicular to the chassis plane 202a in the open position. The screw 208 is preferably secured to the locking flange 212 and moves with the locking flange 212 to and between the closed, slid out and open positions to retain the screw 208 with the locking flange 212. The screw 208 is preferably secured to the locking flange 212 such that the screw 208 is aligned with the screw hole 204 in the chassis 202 in the closed position. The fastener or screw 208 is selectively engageable with the screw hole 204 in the closed position to lock and unlock the control board support 206 to the chassis.

Figure 7A:
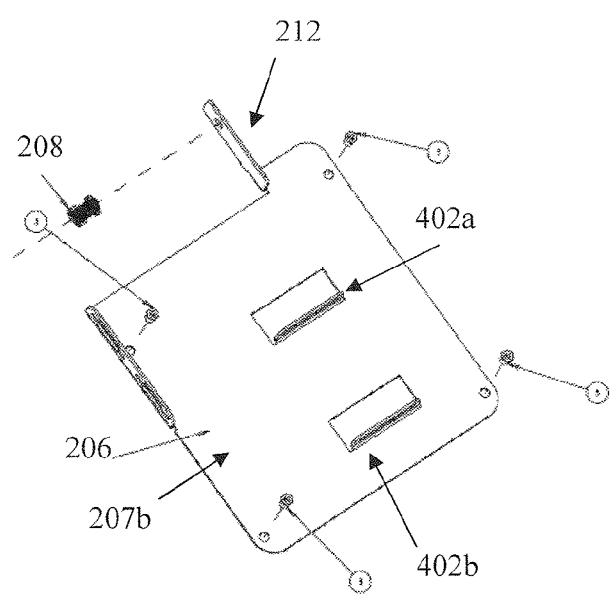
FIG. 7A is a right-side perspective view of the control board support of FIG. 3A.
Figure 7B:
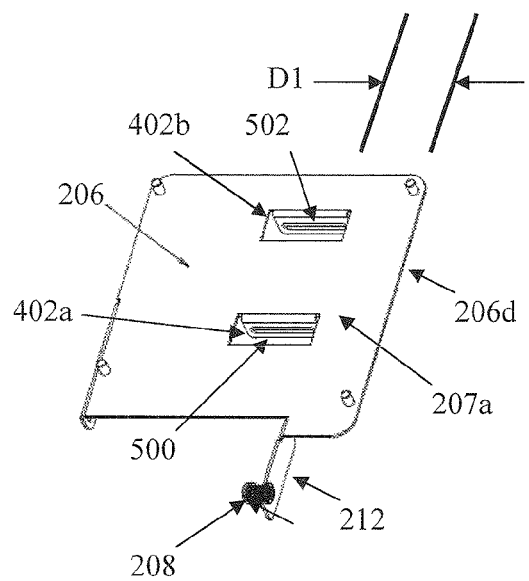
FIG. 7B is a left-side perspective view of the control board support of FIG. 3A.

Referring to FIGS. 7A and 7B, in the preferred embodiment, the first and second slide mounts 402a, 402b include a first end and a second end, and the first end is spaced from a front edge 206d of the control board support 206 at a first distance D1. In the closed position, the front portion 206b of the control board support 206 has a front to rear length of approximately the first distance D1, which extends forwardly beyond the chassis plane 202a. Accordingly, in the closed position, the control board support provides a relatively compact forward to rear dimension due to its sliding and pivotable mounting to the chassis 202, and permits service to the motherboard 22 by a technician through the service opening 30. The control board support 206 is able to straddle the chassis 202 by extending through the relief hole 210 in the closed position to limit the amount of forward to rear space required for mounting the control board support within the internal cavity 16.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. An amusement device having a display, a memory and a controller, the amusement device comprising:
 a housing defining an internal cavity;
 a chassis secured to the housing and positioned at least partially within the internal cavity, the chassis defining a chassis plane; and
 a control board support defining a board plane, the control board support having a closed position and an open position, wherein in the closed position the board plane is generally perpendicular to the chassis plane and in the open position the board plane is generally parallel to the chassis plane, the control board support being slidably and pivotably movable between the closed position and the open position, the control board support generally being positioned within the internal cavity in the open and closed positions and when moving therebetween.

2. The amusement device of claim 1, wherein the control board support is slidably and rotatably attached to the chassis by at least one slide mount.

3. The amusement device of claim 2, wherein the slide mount has an elongated opening having a first end proximate to the chassis and a second end opposite the first end, the elongated opening receiving a dowel pin coupling the slide mount to a joist of the chassis, wherein when the pin is positioned at the first end, the control board support is in one of the closed position and a slid out position relative to the chassis and when the pin is positioned at the second end, the control board support is in the closed position.

4. The amusement device of claim 3, wherein the control board support is not rotatable when the control board support is in the closed position.

5. The amusement device of claim 1 wherein the housing has a service opening and a service opening cover and the control board support has a board side and a rear side.

6. The amusement device of claim 5, further comprising:
a motherboard mounted to the board side of the control board, the motherboard including a plurality of upgradeable components.

7. The amusement device of claim 5, wherein the motherboard is visible through the service opening of the housing when the control board support is in the open position.

8. The amusement device of claim 1, wherein the slide mount is a cutout from the control board support.

9. The amusement device of claim 1, wherein the control board support is maintained in the closed position by a fastener attaching the control board support to the chassis.

10. The amusement device of claim 1, wherein a portion of the control board support is positioned in a relief hole in the chassis when the control board support is in the closed position, and wherein the control board support is positioned outside of the relief hole of the chassis when the control board support is in the open position.

11. An amusement device having a display, a memory and a controller, the amusement device comprising:
a housing defining an internal cavity and a service opening;
a chassis secured to the housing and positioned at least partially within the internal cavity, the chassis defining a chassis plane;
a control board support defining a board plane and having a board side and a rear side;
a motherboard mounted to the board side of the control board support;
a slide mount secured to the rear side of the control board support, the slide mount having an elongated opening; and
a joist mounted to the chassis, the joist including a pin positioned in the elongated opening, the control board being movable between a closed position and an open position by movement of the pin within the elongated opening, the control board support includes a locking flange extending therefrom, the locking flange positioned in facing engagement with the chassis in the closed position and spaced from the chassis in the open position the locking flange includes a lock plane, the lock plane being generally parallel to the chassis plane in the closed position and generally perpendicular to the chassis plane in the open position, the motherboard facing the service opening in the open position to provide access through the opening for service and repair.

12. An amusement device having a display, a memory and a controller, the amusement device comprising:
a housing defining an internal cavity and a service opening;
a chassis secured to the housing and positioned at least partially within the internal cavity, the chassis defining a chassis plane;
a control board support defining a board plane and having a board side and a rear side;
a motherboard mounted to the board side of the control board support;
a slide mount secured to the rear side of the control board support, the slide mount having an elongated opening,
a joist mounted to the chassis, the joist including a pin positioned in the elongated opening, the control board being movable between a closed position and an open position by movement of the pin within the elongated opening the control board support includes a locking flange extending therefrom, the locking flange positioned in facing engagement with the chassis in the closed position and spaced from the chassis in the open position, the motherboard facing the service opening in the open position to provide access through the opening for service and repair; and
a fastener mounted to the locking flange, the chassis including a fastener hole therein, the fastener aligned with the fastener hole in the closed position, the fastener selectively engageable with the fastener hole in the closed position to lock the control board support to the chassis in the closed position.

13. An amusement device having a display, a memory and a controller, the amusement device comprising:
a housing defining an internal cavity and a service opening;
a chassis secured to the housing and positioned at least partially within the internal cavity, the chassis defining a chassis plane;
a control board support having a board side and a rear side, the control board support defines a board plane, the board plane being oriented generally parallel to the chassis plane in the open position and generally perpendicular to the chassis plane in the closed position;
a motherboard mounted to the board side of the control board support;
a slide mount secured to the rear side of the control board support, the slide mount having an elongated opening; and
a joist mounted to the chassis, the joist including a pin positioned in the elongated opening, the control board being movable between a closed position and an open position by movement of the pin within the elongated opening, the motherboard facing the service opening in the open position to provide access through the opening for service and repair.

14. The amusement device of claim 13 wherein the slide mount is comprised of a first slide mount and a second slide mount, the first and second slide mounts being comprised of flanges formed by bent portions of the control board support, thereby defining cutouts adjacent the first and second slide mounts.

15. The amusement device of claim 13 wherein the joist is comprised of a first L-shaped bracket and a second L-shaped bracket and the pin is comprised of a first dowel pin and a second dowel pin.

16. The amusement device of claim 13 wherein the pin includes a first head and a first shaft, a first end of the first shaft fixed to a distal end of the first L-shaped bracket, the first head spaced from the first end with the first shaft therebetween, the first shaft riding in the elongated opening to guide the movement of the control board support between the open and closed positions.

17. The amusement device of claim 13 wherein the motherboard includes a plurality of upgradeable components.

18. An amusement device having a display, a memory and a controller, the amusement device comprising:
- a housing defining an internal cavity and a service opening;
- a chassis secured to the housing and positioned at least partially within the internal cavity, the chassis defining a chassis plane;
- a control board support defining a board plane and having a board side and a rear side;
- a motherboard mounted to the board side of the control board support;
- a slide mount secured to the rear side of the control board support, the slide mount having an elongated opening, the slide mount includes a first end and a second end, the first end spaced from a front edge of the control board support at a first distance, the chassis including a relief hole therein; and
- a joist mounted to the chassis, the joist including a pin positioned in the elongated opening the control board being movable between a closed position and an open position by movement of the pin within the elongated opening the motherboard facing the service opening in the open position to provide access through the opening for service and repair, the control board support extending through the relief hole in the closed position such that a front portion of the control board support is positioned in front of the chassis and a rear portion of the control board support is positioned to the rear of the chassis in the closed position, the control board support positioned to the rear of the chassis in the open position.

* * * * *